US010380856B2

(12) United States Patent
Devison et al.

(10) Patent No.: US 10,380,856 B2
(45) Date of Patent: *Aug. 13, 2019

(54) MOTION LOCALIZATION BASED ON CHANNEL RESPONSE CHARACTERISTICS

(71) Applicant: Cognitive Systems Corp., Waterloo (CA)

(72) Inventors: Stephen Arnold Devison, Kitchener (CA); Mohammad Omer, Waterloo (CA); Yunfeng Piao, Kitchener (CA); Marco Nogueira, Cambridge (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,705

(22) Filed: Oct. 1, 2018

(65) Prior Publication Data

US 2019/0147713 A1    May 16, 2019

Related U.S. Application Data

(63) Continuation of application No. 15/815,199, filed on Nov. 16, 2017, now Pat. No. 10,109,168.

(51) Int. Cl.
*G08B 13/24* (2006.01)
*H04L 25/02* (2006.01)

(52) U.S. Cl.
CPC ............ *G08B 13/24* (2013.01); *H04L 25/022* (2013.01)

(58) Field of Classification Search
CPC .............................. G08B 13/24; H04L 25/022
USPC ....................................................... 340/552
See application file for complete search history.

(56) References Cited

U.S. PATENT DOCUMENTS

| 4,054,879 A | 10/1977 | Wright et al. |
| 4,075,573 A | 2/1978 | Kennedy et al. |
| 4,193,055 A | 3/1980 | Barnum |
| 4,225,858 A | 9/1980 | Cole et al. |
| 4,286,260 A | 8/1981 | Gershberg et al. |
| 4,649,388 A | 3/1987 | Atlas |
| 4,740,045 A | 4/1988 | Goodson et al. |
| 4,870,663 A | 9/1989 | Kulju et al. |

(Continued)

FOREIGN PATENT DOCUMENTS

| CA | 2834522 | 5/2014 |
| CA | 2945702 | 8/2015 |

(Continued)

OTHER PUBLICATIONS

USPTO; Restriction Requirement dated Jan. 23, 2018, in U.S. Appl. No. 15/706,295.

(Continued)

*Primary Examiner* — Jack K Wang
(74) *Attorney, Agent, or Firm* — Henry Patent Law Firm PLLC

(57) ABSTRACT

In a general aspect, detected motion is localized based on channel response characteristics. In some aspects, channel responses based on wireless signals transmitted through a space between wireless communication devices are obtained. A motion detection process is executed to detect motion of an object in the space based on the channel responses, and the channel responses are analyzed to identify a location of the detected motion within one of a plurality of regions within the space.

29 Claims, 8 Drawing Sheets

(56) References Cited

U.S. PATENT DOCUMENTS

| | | |
|---|---|---|
| 5,270,720 A | 12/1993 | Stove |
| 5,519,400 A | 5/1996 | McEwan |
| 5,696,514 A | 12/1997 | Nathanson et al. |
| 6,075,797 A | 6/2000 | Thomas |
| 6,493,380 B1 | 12/2002 | Wu et al. |
| 6,573,861 B1 | 6/2003 | Hommel et al. |
| 7,047,015 B2 | 5/2006 | Hawe |
| 7,295,109 B2 | 11/2007 | Kobayashi |
| 7,317,419 B2 | 1/2008 | Sugar et al. |
| 7,652,617 B2 | 1/2010 | Kurtz et al. |
| 7,916,066 B1 | 3/2011 | Osterweil |
| 8,138,918 B2 | 3/2012 | Habib |
| 8,331,498 B2 | 12/2012 | Huang et al. |
| 8,477,750 B2 | 7/2013 | Agarwal et al. |
| 8,710,984 B2 | 4/2014 | Wilson et al. |
| 8,818,288 B2 | 8/2014 | Patwari et al. |
| 8,836,344 B2 | 9/2014 | Habib et al. |
| 9,030,321 B2 | 5/2015 | Breed |
| 9,143,413 B1 | 9/2015 | Manku et al. |
| 9,143,968 B1 | 9/2015 | Manku et al. |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,743,294 B1 | 8/2017 | Omer et al. |
| 9,927,519 B1 | 3/2018 | Omer et al. |
| 9,933,517 B1 | 4/2018 | Olekas et al. |
| 9,989,622 B1 | 6/2018 | Griesdorf et al. |
| 10,004,076 B1 | 6/2018 | Griesdorf et al. |
| 10,048,350 B1* | 8/2018 | Piao ............... G01S 13/56 |
| 10,108,903 B1* | 10/2018 | Piao ............... G06N 3/0454 |
| 10,109,167 B1 | 10/2018 | Olekas et al. |
| 10,109,168 B1 | 10/2018 | Devison et al. |
| 10,129,853 B2* | 11/2018 | Manku ............... G08B 13/2491 |
| 2001/0046870 A1 | 11/2001 | Stilp et al. |
| 2003/0007473 A1 | 1/2003 | Strong et al. |
| 2003/0108119 A1 | 6/2003 | Mohebbi et al. |
| 2005/0055568 A1 | 3/2005 | Agrawala et al. |
| 2005/0083199 A1 | 4/2005 | Hall et al. |
| 2006/0217132 A1 | 9/2006 | Drummond-Murray et al. |
| 2007/0293232 A1 | 12/2007 | Nonaka |
| 2007/0296571 A1 | 12/2007 | Kolen |
| 2008/0119130 A1 | 5/2008 | Sinha |
| 2008/0240008 A1 | 10/2008 | Backes et al. |
| 2008/0303655 A1 | 12/2008 | Johnson |
| 2009/0040952 A1 | 2/2009 | Cover et al. |
| 2009/0062696 A1 | 3/2009 | Nathan et al. |
| 2009/0079615 A1 | 3/2009 | Wu et al. |
| 2009/0128302 A1 | 5/2009 | Srinivasan et al. |
| 2009/0128360 A1 | 5/2009 | Bianchi et al. |
| 2010/0013636 A1 | 1/2010 | Wu |
| 2010/0026490 A1 | 2/2010 | Butler et al. |
| 2010/0103020 A1 | 4/2010 | Wu |
| 2010/0130229 A1 | 5/2010 | Sridhara et al. |
| 2010/0315284 A1 | 12/2010 | Trizna et al. |
| 2011/0130092 A1 | 6/2011 | Yun et al. |
| 2011/0148689 A1 | 6/2011 | Filippi et al. |
| 2011/0199304 A1 | 8/2011 | Walley et al. |
| 2012/0009882 A1 | 1/2012 | Patwari et al. |
| 2012/0011365 A1 | 1/2012 | Schmidt et al. |
| 2012/0115512 A1 | 5/2012 | Grainger et al. |
| 2012/0146788 A1 | 6/2012 | Wilson et al. |
| 2012/0184296 A1 | 7/2012 | Milosiu |
| 2012/0212366 A1 | 8/2012 | Alalusi |
| 2013/0005280 A1 | 1/2013 | Leung et al. |
| 2013/0090151 A1 | 4/2013 | Ngai et al. |
| 2013/0162459 A1 | 6/2013 | Aharony et al. |
| 2013/0283256 A1 | 10/2013 | Proud |
| 2014/0004874 A1 | 1/2014 | Schwartz et al. |
| 2014/0015706 A1 | 1/2014 | Ishihara et al. |
| 2014/0128778 A1 | 5/2014 | Chan et al. |
| 2014/0135042 A1 | 5/2014 | Buchheim et al. |
| 2014/0140231 A1* | 5/2014 | Haiut ............... G01S 13/003 370/252 |
| 2014/0247179 A1 | 9/2014 | Furuskog |
| 2014/0285324 A1 | 9/2014 | Austin |
| 2014/0286380 A1 | 9/2014 | Prager et al. |
| 2014/0301260 A1 | 10/2014 | Park et al. |
| 2015/0043377 A1 | 2/2015 | Cholas et al. |
| 2015/0063323 A1* | 3/2015 | Sadek ............... H04W 72/1215 370/336 |
| 2015/0078295 A1 | 3/2015 | Mandyam et al. |
| 2015/0098377 A1 | 4/2015 | Amini et al. |
| 2015/0189528 A1 | 7/2015 | Carbajal |
| 2015/0195100 A1 | 7/2015 | Imes et al. |
| 2015/0212205 A1 | 7/2015 | Shpater |
| 2015/0245164 A1* | 8/2015 | Merrill ............... H04W 4/06 370/329 |
| 2015/0292879 A1 | 10/2015 | Zhou et al. |
| 2015/0338507 A1 | 11/2015 | Oh et al. |
| 2015/0350976 A1 | 12/2015 | Kodali et al. |
| 2015/0356289 A1 | 12/2015 | Brown et al. |
| 2016/0018508 A1* | 1/2016 | Chen ............... G01S 5/0252 455/456.1 |
| 2016/0182170 A1 | 6/2016 | Daoura et al. |
| 2016/0183059 A1 | 6/2016 | Nagy et al. |
| 2016/0187475 A1 | 6/2016 | Horng et al. |
| 2016/0210838 A1* | 7/2016 | Yan ............... G08B 21/043 |
| 2016/0217417 A1 | 7/2016 | Ma et al. |
| 2016/0241999 A1 | 8/2016 | Chin et al. |
| 2017/0042488 A1 | 2/2017 | Muhsin |
| 2017/0146656 A1* | 5/2017 | Belsley ............... G01S 17/58 |
| 2017/0195893 A1* | 7/2017 | Lee ............... H04W 16/28 |
| 2017/0278374 A1 | 9/2017 | Skaaksrud |
| 2017/0280351 A1 | 9/2017 | Skaaksrud |
| 2017/0309146 A1 | 10/2017 | MacKenzie et al. |
| 2017/0343658 A1 | 11/2017 | Ramirez et al. |

FOREIGN PATENT DOCUMENTS

| | | |
|---|---|---|
| WO | 2014/021574 | 2/2014 |
| WO | 2014201574 | 12/2014 |
| WO | 2015/168700 | 11/2015 |
| WO | 2016/110844 | 7/2016 |

OTHER PUBLICATIONS

Canadian Intellectual Property Office, International Search Report and Written Opinion for International Application No. PCT/CA2017/050037 dated Apr. 13, 2017, 12 pages.

USPTO, Notice of Allowance issued in U.S. Appl. No. 15/461,125 dated Aug. 30, 2017, 15 pages.

USPTO, Notice of Allowance dated Jan. 29, 2018, in U.S. Appl. No. 15/461,125, 16 pgs.

USPTO, Notice of Allowance dated Jun. 28, 2018, in U.S. Appl. No. 15/706,295, 16 pgs.

USPTO, Non-Final Office Action issued in U.S. Appl. No. 15/691,195 dated Nov. 15, 2017, 17 pgs.

USPTO, Notice of Allowance dated May 2, 2018, in U.S. Appl. No. 15/691,195, 21 pgs.

Notice of Allowance dated Jun. 22, 2018, in U.S. Appl. No. 15/815,199, 22 pgs.

USPTO, Notice of Allowance dated Feb. 13, 2018, in U.S. Appl. No. 15/683,637, 25 pgs.

USPTO, Notice of Allowance dated Jul. 6, 2018, in U.S. Appl. No. 15/789,761, 26 pgs.

USPTO, Notice of Allowance dated May 1, 2018, in U.S. Appl. No. 15/799,768, 27 pgs.

USPTO, Notice of Allowance dated Jan. 10, 2018, in U.S. Appl. No. 15/803,189, 28 pgs.

USPTO, Non-Final Office Action dated Feb. 7, 2018, in U.S. Appl. No. 15/176,489, 30 pgs.

USPTO, Non-Final Office Action dated Dec. 28, 2017, in U.S. Appl. No. 15/789,761, 31 pgs.

USPTO; Non-Final Office Action dated Jan. 23, 2018, in U.S. Appl. No. 15/789,815, 35 pgs.

USPTO, Final Office Action dated Jul. 5, 2018, in U.S. Appl. No. 15/789,815, 36 pgs.

USPTO, Non-Final Office Action dated Jan. 26, 2018, in U.S. Appl. No. 15/815,199, 36 pgs.

(56) References Cited

OTHER PUBLICATIONS

USPTO, Non-Final Office Action dated Mar. 14, 2018, in U.S. Appl. No. 15/706,295, 39 pgs.
USPTO, Notice of Allowance dated Mar. 8, 2018, in U.S. Appl. No. 15/706,193, 40 pgs.
USPTO, Non-Final Office Action dated Mar. 9, 2018, in U.S. Appl. No. 15/836,606, 49 pgs.
USPTO, Restriction Requirement, in U.S. Appl. No. 15/799,806, 5 pgs.
USPTO, Non-Final Office Action received in U.S. Appl. No. 15/799,768 dated Dec. 13, 2017, 7 pgs.
Canadian Intellectual Property Office, International Search Report and Written Opinion issued International Application No. PCT/CA2016/051228 dated Apr. 25, 2017, 8 pages.
WIPO, International Search Report and Written Opinion dated May 18, 2018, in PCT/CA2018/050051, 8 pgs.
Canadian Intellectual Property Office, International Search Report and Written Opinion issued in International Application No. PCT/CA2016/051466 dated Mar. 14, 2017, 9 pages.
CIPO, International Search Report and Written Opinion dated Feb. 9, 2018, in PCT/CA2017/051276, 9 pgs.
CIPO, International Search Report and Written Opinion dated Jan. 26, 2018, in PCT/CA2017/051290, 9 pgs.
WIPO, International Search Report and Written Opinion dated Apr. 25, 2018, in PCT/CA2018/050046, 9 pgs.
WIPO, International Search Report and Written Opinion dated Jul. 24, 2018, in PCT/CA2018/050128, 9 pgs.
"A Guide to TF Layers: Building a Convolutional Neural Network", TensorFlow; https://www.tensorflow.org/tutorials/layers; downloaded Nov. 20, 2017, 17 pgs.
"An Intuitive Explanation of Convolutional Neural Networks", the data science blog; https://ujjwalkam.me/2016/08/11/intuitive-explanation-convnets/, Sep. 15, 2017, 23 pgs.
"Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016."
"Artificial neural network", Wikipedia; https://en.wikipedia.org/wiki/Artificial_neural_network; downloaded Sep. 15, 2017, 39 pgs.
"CEVA; "CEVA's DSP Cores Power the World's Leading Mobile Broadband and M2M Applications"; http://www.ceva-dsp.com/Mobile-Broadband; 3 pages; May 15, 2016."
"Convolutional neural network", Wikipedia; https://en.wikipedia.org/wiki/Convolutional_neural_network; downloaded Sep. 15, 2017, 19 pgs.
"Japan Radio Co., Ltd; "26GHz FWA—Technology"; http://www.jrc.co.jp/eng/product/lneup/26ghz_wireless_ip_access_system/tech.html; 3 pages; May 15, 2016."
"Non-Final Office Action received in U.S. Appl. No. 15/099,833, dated Jun. 27, 2016, 16 pages".
"Non-Final Office Action received in U.S. Appl. No. 15/151,571, dated Aug. 5, 2016, 18 pages".
"Notice of Allowance received in U.S. Appl. No. 15/099,833, dated Oct. 14, 2016, 8 pages".
"Notice of Allowance received in U.S. Appl. No. 15/151,571, dated Jan. 10, 2017, 9 pages".
"Notice of Allowance received in U.S. Appl. No. 15/228,418, dated Oct. 12, 2016, 9 pages".

"quora.com; "What is the function of the baseband processor in wireless devices?"; https://ww.quora.com/What-is-the-function-of-the-baesband-processor-in-wireless-devices; 2 pages; May 15, 2016."
"Wikipedia; "Baseband processor"; rhttps://en.wikipedia.org/wiki/Bandband_processor; 2 pages; version dated Apr. 20, 2016."
CIPO , "International Search Report and Written Opinion", in International Application No. PCT/CA2016/051229, dated Jan. 17, 2017, 9 pages.
Dekker , et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
Depatala , et al., "Occupancy Estimation Using Only WiFi Power Measurements", IEEE Journal on Selected Areas in Communications, vol. 33, No. 7; pp. 1381-1393, Jul. 2015, 13 pgs.
Hyder , et al., "Acoustic Scene Classification using a CNN-SuperVector system trained with Auditory and Spectrogram Image Features", Interspeech 2017, Stockholm Sweden, Aug. 20-24, 2017, 5 pgs.
Li , et al., "A Convolutional Neural Network Cascade for Face Detection", IEEE, 2015, 10 pgs.
Netgear , "N600 Wifi Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, Aug. 21, 2014, 101 pages.
OpenWRT , "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.
USPTO, Non-Final Office Action dated Nov. 1, 2018, in U.S. Appl. No. 16/121,971, 44 pgs.
Tsironi , et al., "Gesture Recognition with a Convolutional Long Short-Term Memory Recurrent Neural Network", European Symposium on Artificial Neural Networks, Computational Intelligence and Machine Learning, Bruges (Belgium), Apr. 27-29, 2016, 6 pgs.
USPTO , Final Office Action received in U.S. Appl. No. 15/176,489 dated Jun. 23, 2017, 23 pages.
USPTO , Notice of Allowance issued in U.S. Appl. No. 15/460,643 dated Jun. 12, 2017, 34 pages.
USPTO , Non-final Office Action issued in U.S. Appl. No. 15/461,125 dated Apr. 19, 2017, 56 pages.
USPTO , "Non-final Office Action", issued in U.S. Appl. No. 15/176,489 dated Mar. 22, 2017, 41 pages.
Wei , et al., "Radio-based Device-free Activity Recognition with Radio Frequency Interference", IPSN '15 Proceedings of the 14th International Conference on Information Processing in Sensor Networks, Apr. 13-16, 2015, 12 pgs.
Youssef, Moustafa , et al., "Challenges: Device-free Passive Localization for Wireless Environments", Mobicom 07 Proceedings of the 13th Annual ACM International Conference on Mobile Computing and Networking, Sep. 2007, 11 pgs.
Zheng , et al., "Detecting Radio Frequency Interference for CSI Measurements on COTS WiFi Devices", IEEE ICC 2017, Ad-Hoc and Sensor Networking Symposium, May 2017, 6 pgs.
Zheng , et al., "Time Series Classification Using Multi-Channels Deep Convolutional Neural Networks", 2014, 13 pgs.

\* cited by examiner

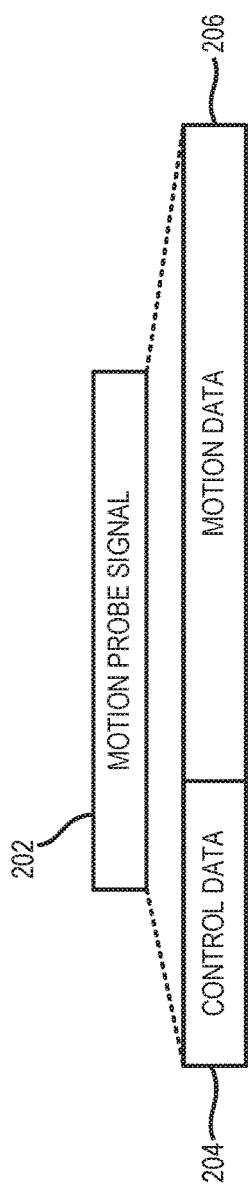
Fig. 2
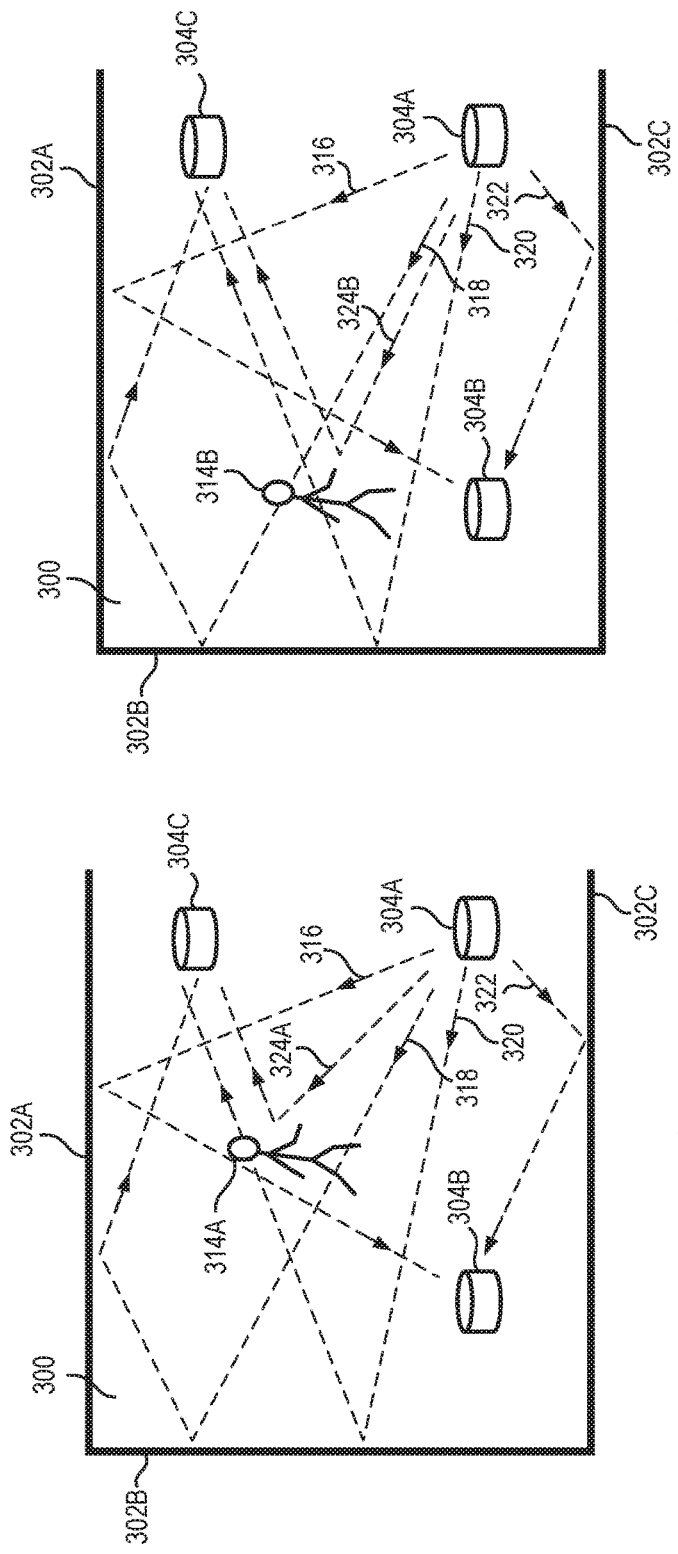
Fig. 3A
Fig. 3B

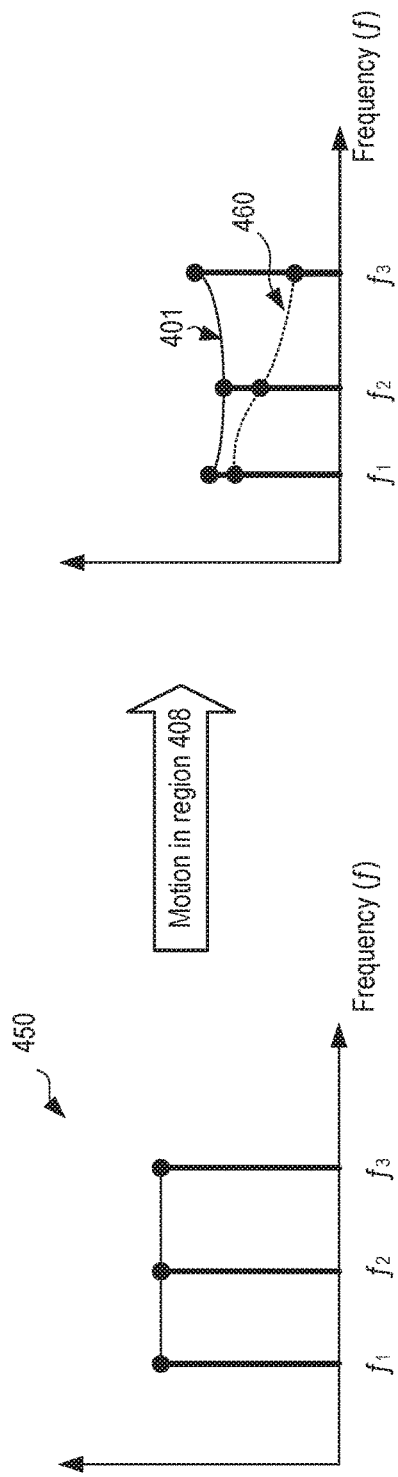
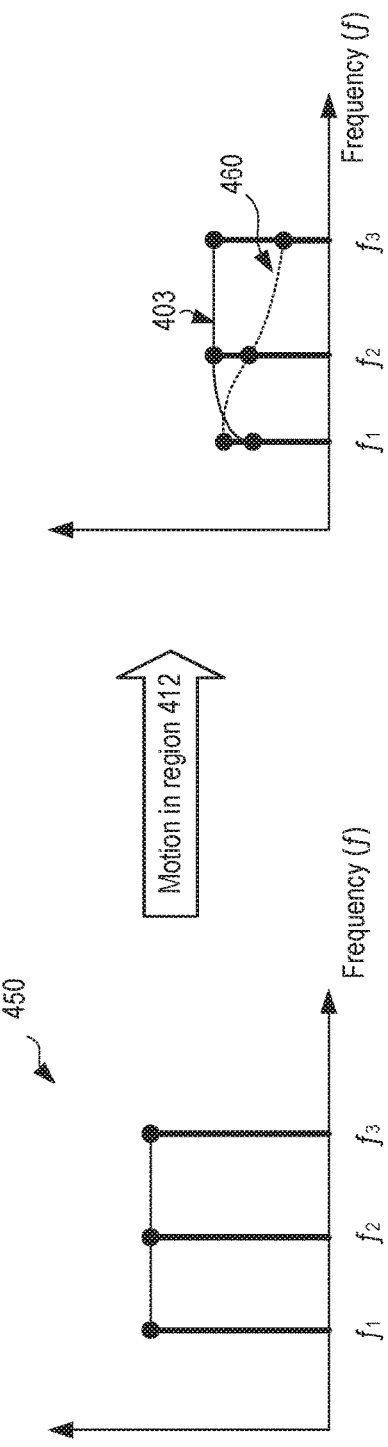
Fig. 4C
Fig. 4D

MOTION LOCALIZATION BASED ON CHANNEL RESPONSE CHARACTERISTICS

CROSS REFERENCE TO RELATED APPLICATIONS

This application is a continuation of U.S. patent application Ser. No. 15/815,199, filed Nov. 16, 2017, entitled "Motion Localization Based on Channel Response Characteristics," the contents of which are incorporated herein by reference.

BACKGROUND

The following description relates to motion detection and motion localization.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 2 is a diagram showing an example motion probe signal.

FIGS. 3A and 3B are diagrams showing example wireless signals communicated between wireless communication devices.

FIGS. 4C-4D are plots showing the example channel responses of FIGS. 4A-4B overlaid on an example channel response associated with no motion occurring in the space.

DETAILED DESCRIPTION

In some aspects of what is described, detected motion is localized based on channel response characteristics. For example, in some instances, a motion detection system performs machine learning to associate motion of an object within a distinct region within a space with characteristics shared by channel responses obtained while motion of the object occurred within the distinct region. Also, the motion detection system performs RF motion localization to identify a distinct region within the space based on the machine-learned associations stored in a motion detection database. Each machine-learned association includes a shared channel response characteristic associated with a distinct region within the space.

The systems and techniques described here may provide one or more advantages in some instances. For example, motion may be detected using wireless signals transmitted through a space. In addition, a location of the motion may be by using only two wireless communication devices, and without triangulation. Also, a neural network can enable the motion detection system to dynamically improve its ability to identify shared characteristics within channel responses obtained while motion of an object occurred within a distinct region over time, for example, by repeating machine learning processes over several training periods.

Figure 1:
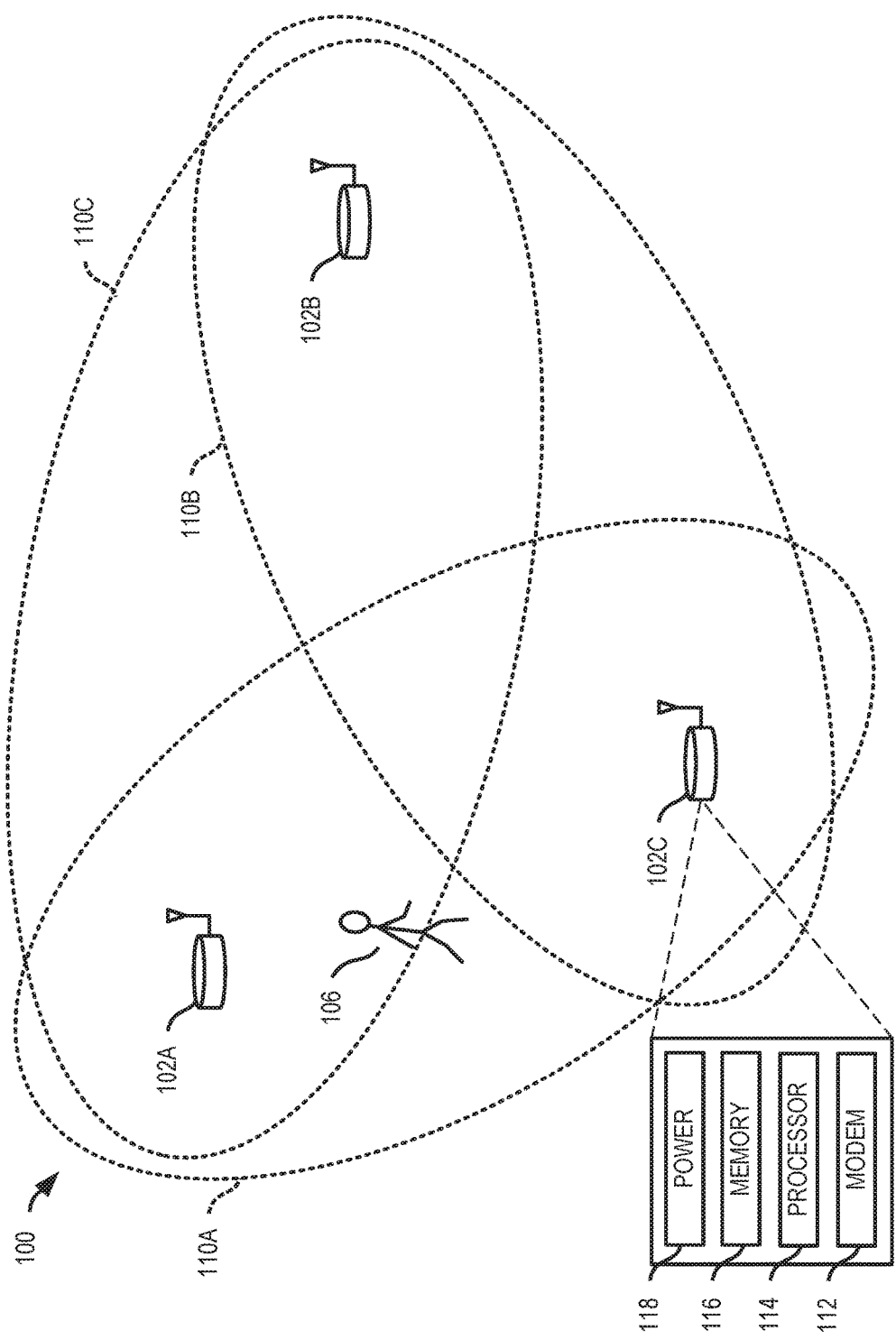
FIG. 1 is a diagram showing an example wireless communication system.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1, the wireless communication devices 102A, 102B, 102C can be, or they may include, standard wireless network components. For example, the wireless communication devices 102A, 102B, 102C may be commercially-available Wi-Fi access points or another type of wireless access point (WAP) performing one or more operations as described herein that are embedded as instructions (e.g., software or firmware) on the modem of the WAP. In some cases, the wireless communication devices 102A, 102B, 102C may be nodes of a wireless mesh network, such as, for example, a commercially-available mesh network system (e.g., GOOGLE WIFI). In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system. For example, the dedicated motion detection system can include a hub device and one or more beacon devices (as remote sensor devices), and the wireless communication devices 102A, 102B, 102C can be either a hub device or a beacon device in the motion detection system.

As shown in FIG. 1, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1 or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi or Bluetooth). The modem 112 may be implemented as the example wireless network modem 112 shown in FIG. 1, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general-purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable storage media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. For example, the instructions may include instructions for time-aligning signals using an interference buffer and a motion detection buffer, such as through one or more of the operations of the example processes 600, 700 of FIGS. 6, 7.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1, the wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B to detect motion of an object in a space accessed by the wireless signals, to determine a location of the detected motion, or both. For example, the wireless communication device 102C may perform one or more operations of the example processes described below with respect to FIGS. 3-9, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1, the wireless communication system 100 is a wireless mesh network, with wireless communication links between each of the respective wireless communication devices 102. In the example shown, the wireless communication link between the third wireless communication device 102C and the first wireless communication device 102A can be used to probe a first motion detection field 110A, the wireless communication link between the third wireless communication device 102C and the second wireless communication device 102B can be used to probe a second motion detection field 110B, and the wireless communication link between the first wireless communication device 102A and the second wireless communication device 102B can be used to probe a third motion detection field 110C. In some instances, each wireless communication device 102 detects motion in the motion detection fields 110 accessed by that device by processing received signals that are based on wireless signals transmitted by the wireless communication devices 102 through the motion detection fields 110. For example, when the person 106 shown in FIG. 1 moves in the first motion detection field 110A and the third motion detection field 110C, the wireless communication devices 102 may detect the motion based on signals they received that are based on wireless signals transmitted through the respective motion detection fields 110. For instance, the first wireless communication device 102A can detect motion of the person in both motion detection fields 110A, 110C, the second wireless communication device 102B can detect motion of the person 106 in the motion detection field 110C, and the third wireless communication device 102C can detect motion of the person 106 in the motion detection field 110A.

In some instances, the motion detection fields 110 can include, for example, air, solid materials, liquids, or another medium through which wireless electromagnetic signals may propagate. In the example shown in FIG. 1, the first motion detection field 110A provides a wireless communication channel between the first wireless communication device 102A and the third wireless communication device 102C, the second motion detection field 110B provides a wireless communication channel between the second wireless communication device 102B and the third wireless communication device 102C, and the third motion detection field 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of the wireless communication devices 102 (or another device communicably coupled to the devices 102) may determine that the detected motion is nearby a particular wireless communication device.

FIG. 2 illustrates an example motion probe signal 202. The example motion probe signal 202 can be transmitted, for example, in a wireless communication system to monitor for motion in a space. In some examples, the motion probe signal 202 is implemented as a packet. For instance, the motion probe signal 202 can include binary data that is converted to an analog signal, up-converted to radio frequency, and wirelessly transmitted by an antenna.

The motion probe signal 202 shown in FIG. 2 includes control data 204 and a motion data 206. A motion probe signal 202 may include additional or different features, and may be formatted in another manner. In the example shown, the control data 204 may include the type of control data that would be included in a conventional data packet. For instance, the control data 204 may include a preamble (also called a header) indicating the type of information contained in the motion probe signal 202, an identifier of a wireless device transmitting the motion probe signal 202, a MAC address of a wireless device transmitting the motion probe signal 202, a transmission power, etc. The motion data 206 is the payload of the motion probe signal 202. In some implementations, the motion data 206 can be or include, for example, a pseudorandom code or another type of reference signal. In some implementations, the motion data 206 can be or include, for example, a beacon signal broadcast by a wireless network system.

In an example, the motion probe signal 202 is transmitted by a wireless device (e.g., the wireless communication device 102A shown in FIG. 1) and received at a motion detection device (e.g., the wireless communication device 102C shown in FIG. 1). In some cases, the control data 204 changes with each transmission, for example, to indicate the time of transmission or updated parameters. The motion data 206 can remain unchanged in each transmission of the motion probe signal 202. The receiving wireless communication device can process the received signals based on each transmission of the motion probe signal 202, and analyze the motion data 206 for changes. For instance, changes in the motion data 206 may indicate movement of an object in a space accessed by the wireless transmission of the motion probe signal 202. The motion data 206 can then be processed, for example, to generate a response to the detected motion.

FIGS. 3A and 3B are diagrams showing example wireless signals communicated between wireless communication devices 304A, 304B, 304C. The wireless communication devices 304A, 304B, 304C can be, for example, the wireless communication devices 102A, 102B, 102C shown in FIG. 1, or other types of wireless communication devices. The example wireless communication devices 304A, 304B, 304C transmit wireless signals through a space 300. The example space 300 can be completely or partially enclosed or open at one or more boundaries of the space 300. The space 300 can be or can include an interior of a room, multiple rooms, a building, an indoor area, outdoor area, or the like. A first wall 302A, a second wall 302B, and a third wall 302C at least partially enclose the space 300 in the example shown.

In the example shown in FIGS. 3A and 3B, the first wireless communication device 304A is operable to transmit wireless signals repeatedly (e.g., periodically, intermittently, at scheduled, unscheduled or random intervals, etc.). The transmitted signals may be formatted like the motion probe signal 202 of FIG. 2, or in another manner. The second and third wireless communication devices 304B, 304C are operable to receive signals based on those transmitted by the wireless communication device 304A. The wireless communication devices 304B, 304C each have a modem (e.g., the modem 112 shown in FIG. 1) that is configured to process received signals to detect motion of an object in the space 300.

As shown, an object is in a first position 314A in FIG. 3A, and the object has moved to a second position 314B in FIG. 3B. In FIGS. 3A and 3B, the moving object in the space 300 is represented as a human, but the moving object can be another type of object. For example, the moving object can be an animal, an inorganic object (e.g., a system, device, apparatus, or assembly), an object that defines all or part of the boundary of the space 300 (e.g., a wall, door, window, etc.), or another type of object.

As shown in FIGS. 3A and 3B, multiple example paths of the wireless signals transmitted from the first wireless communication device 304A are illustrated by dashed lines. Along a first signal path 316, the wireless signal is transmitted from the first wireless communication device 304A and reflected off the first wall 302A toward the second wireless communication device 304B. Along a second signal path 318, the wireless signal is transmitted from the first wireless communication device 304A and reflected off the second wall 302B and the first wall 302A toward the third wireless communication device 304C. Along a third signal path 320, the wireless signal is transmitted from the first wireless communication device 304A and reflected off the second wall 302B toward the third wireless communication device 304C. Along a fourth signal path 322, the wireless signal is transmitted from the first wireless communication device 304A and reflected off the third wall 302C toward the second wireless communication device 304B.

In FIG. 3A, along a fifth signal path 324A, the wireless signal is transmitted from the first wireless communication device 304A and reflected off the object at the first position 314A toward the third wireless communication device 304C. Between FIGS. 3A and 3B, a surface of the object moves from the first position 314A to a second position 314B in the space 300 (e.g., some distance away from the first position 314A). In FIG. 3B, along a sixth signal path 324B, the wireless signal is transmitted from the first wireless communication device 304A and reflected off the object at the second position 314B toward the third wireless communication device 304C. The sixth signal path 324B depicted in FIG. 3B is longer than the fifth signal path 324A depicted in FIG. 3A due to the movement of the object from the first position 314A to the second position 314B. In some examples, a signal path can be added, removed, or otherwise modified due to movement of an object in a space.

The example wireless signals shown in FIGS. 3A and 3B may experience attenuation, frequency shifts, phase shifts, or other effects through their respective paths and may have portions that propagate in another direction, for example, through the walls 302A, 302B, and 302C. In some examples, the wireless signals are radio frequency (RF) signals. The wireless signals may include other types of signals.

In the example shown in FIGS. 3A and 3B, the first wireless communication device 304A can repeatedly transmit a wireless signal. In particular, FIG. 3A shows the wireless signal being transmitted from the first wireless communication device 304A at a first time, and FIG. 3B shows the same wireless signal being transmitted from the first wireless communication device 304A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 304A in an omni-directional manner, in a directional manner or otherwise. In the example shown, the wireless signals traverse multiple respective paths in the space 300, and the signal along each path may become attenuated due to path losses, scattering, reflection, or the like and may have a phase or frequency offset.

As shown in FIGS. 3A and 3B, the signals from various paths 316, 318, 320, 322, 324A, and 324B combine at the third wireless communication device 304C and the second wireless communication device 304B to form received signals. Because of the effects of the multiple paths in the space 300 on the transmitted signal, the space 300 may be represented as a transfer function (e.g., a filter) in which the transmitted signal is input and the received signal is output. When an object moves in the space 300, the attenuation or phase offset affected upon a signal in a signal path can change, and hence, the transfer function of the space 300 can change. Assuming the same wireless signal is transmitted from the first wireless communication device 304A, if the transfer function of the space 300 changes, the output of that transfer function—the received signal—will also change. A change in the received signal can be used to detect movement of an object.

Mathematically, a transmitted signal f(t) transmitted from the first wireless communication device 304A may be described according to Equation (1):

$$f(t) = \sum_{n=-\infty}^{\infty} c_n e^{j\omega_n t} \qquad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 304A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \qquad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \qquad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \qquad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \qquad (5)$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as:

$$h_{ch} = \sum_k \sum_{n=-\infty}^{\infty} \alpha_{n,k}. \qquad (6)$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as:

$$\hat{R}_{cvd} = R_{ef} \otimes h_{ch} = \sum_{k=-m}^{m} R_{ef}(n-k)h_{ch}(k) \quad (7)$$

with the optimization criterion $$\min_{h_{ch}} \sum (\hat{R}_{cvd} - R_{cvd})^2. \quad (8)$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figure 3C:
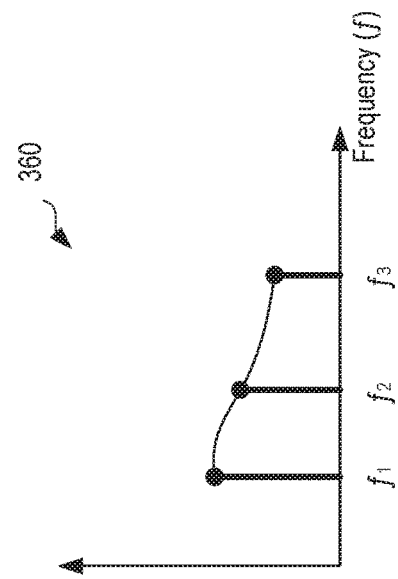
FIGS. 3C-3D are plots showing examples of channel responses computed from the wireless signals communicated between wireless communication devices in FIGS. 3A-3B.
Figure 3C:
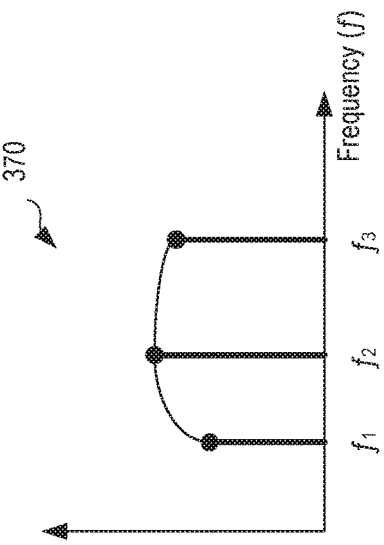
Figure 3D:
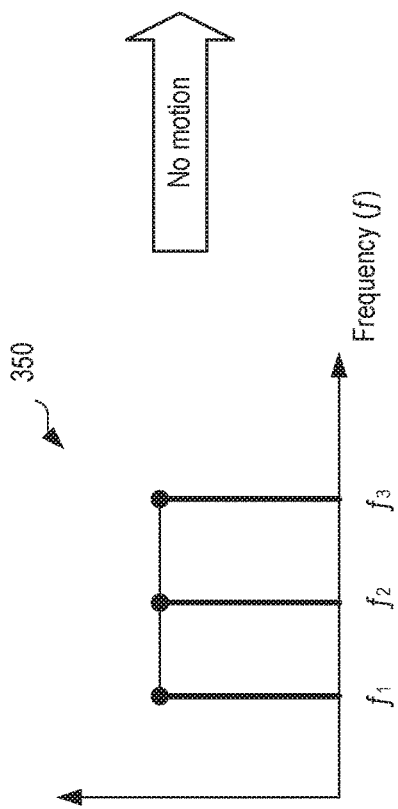

FIGS. 3C-3D are plots showing examples of channel responses 360, 370 computed from the wireless signals communicated between wireless communication devices 304A, 304B, 304C in FIGS. 3A-3B. FIGS. 3C-3D also show a frequency domain representation 350 of an initial wireless signal transmitted by the wireless communication device 304A. In the examples shown, the channel response 360 in FIG. 3C represents the signals received by the wireless communication device 304B when there is no motion in the space 300, and the channel response 370 in FIG. 3D represents the signals received by the wireless communication device 304B in FIG. 3B after the object has moved in the space 300.

In the example shown in FIGS. 3C-3D, for illustration purposes, the wireless communication device 304A transmits a signal that has a flat frequency profile (the magnitude of each frequency component $f_1$, $f_2$, and $f_3$ is the same), as shown in the frequency domain representation 350. Because of the interaction of the signal with the space 300 (and the objects therein), the signals received at the wireless communication device 304B that are based on the signal sent from the wireless communication device 304A look different from the transmitted signal. In this example, where the transmitted signal has a flat frequency profile, the received signal represents the channel response of the space 300. As shown in FIGS. 3C-3D, the channel responses 360, 370 are different from the frequency domain representation 350 of the transmitted signal. When motion occurs in the space 300, a variation in the channel response will also occur. For example, as shown in FIG. 3D, the channel response 370 that is associated with motion of object in the space 300 varies from the channel response 360 that is associated with no motion in the space 300.

Furthermore, as an object moves within the space 300, the channel response may vary from the channel response 370. In some cases, the space 300 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
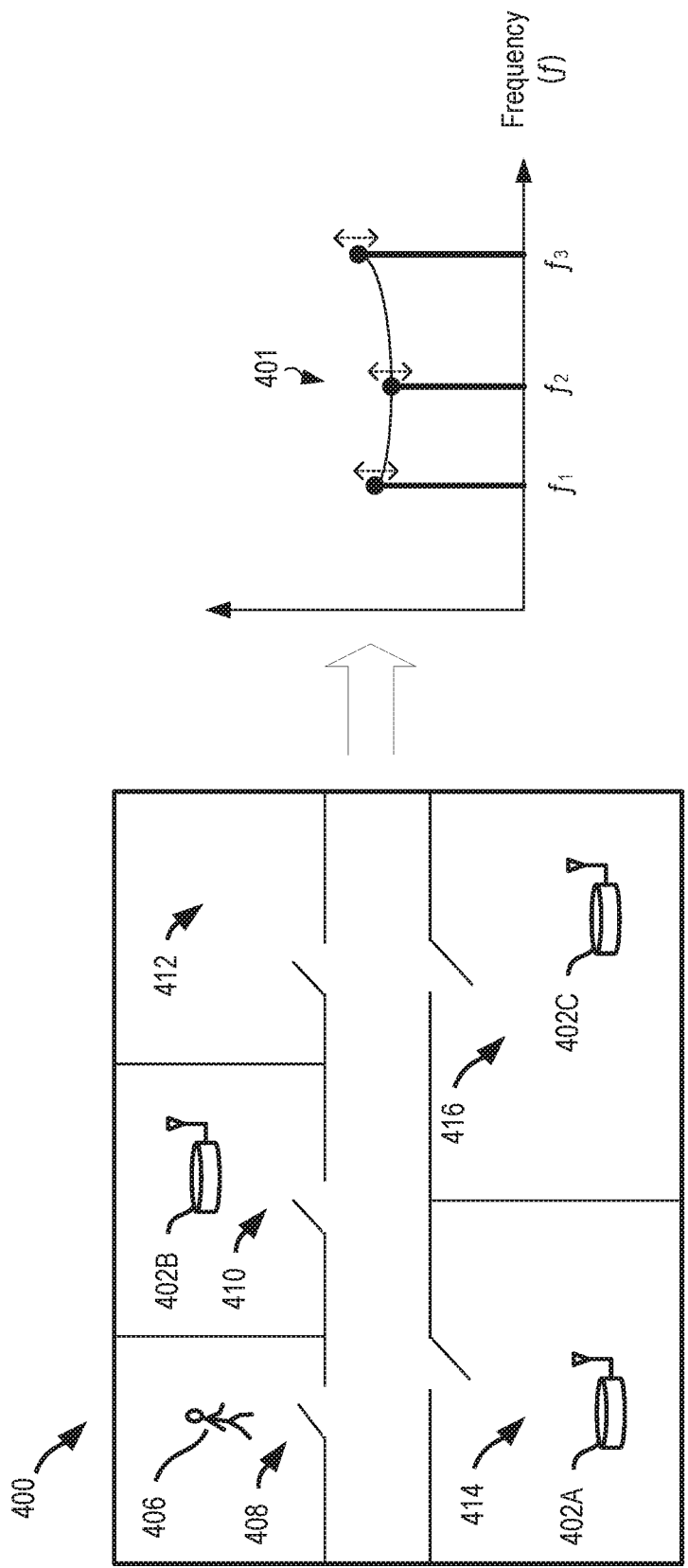
FIGS. 4A-4B are diagrams showing example channel responses associated with motion of an object in distinct regions of a space.
Figure 4B:
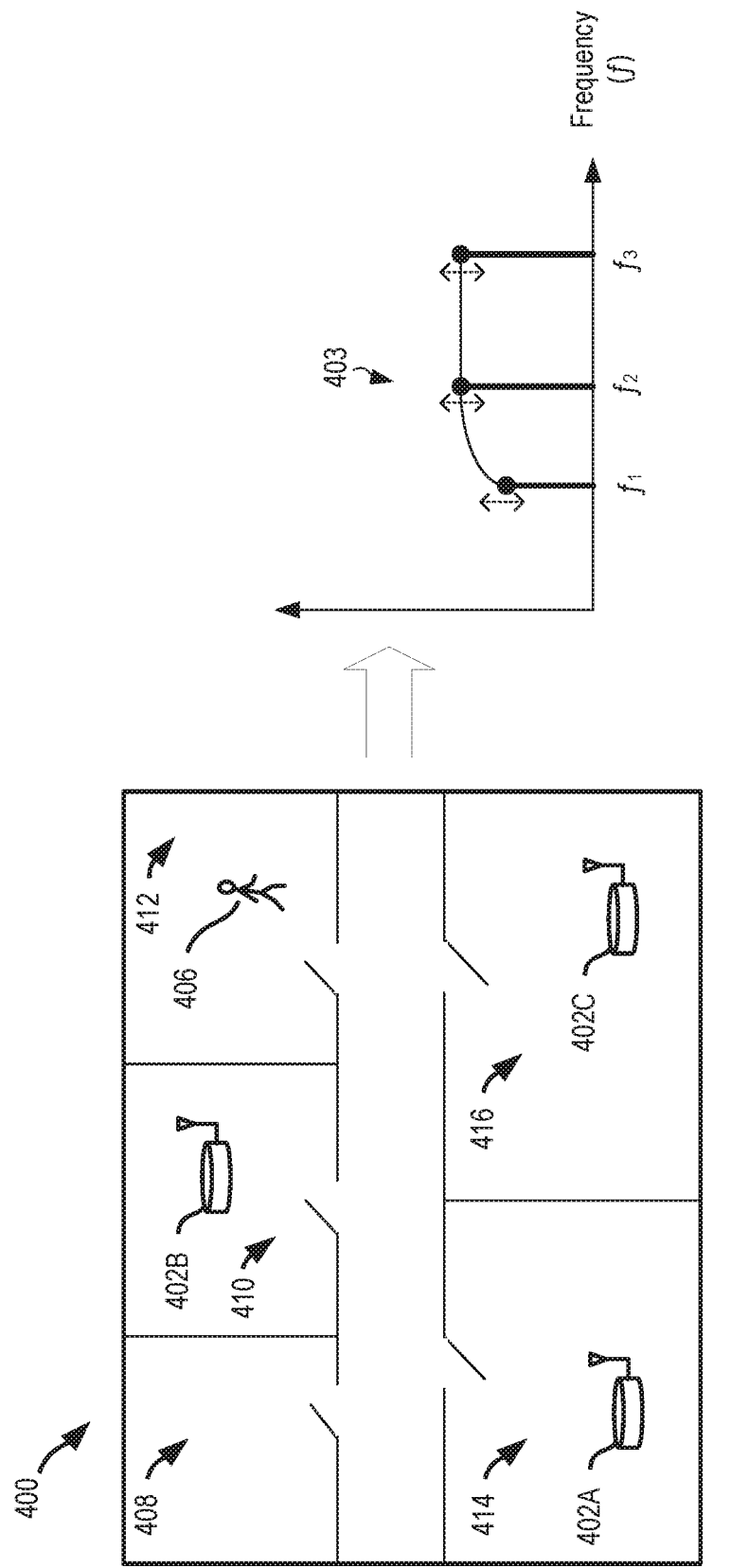

FIGS. 4A-4B are diagrams showing example channel responses 401, 403 associated with motion of an object 406 in distinct regions 408, 412 of the space 400. In the examples shown, the space 400 is a building, and the space 400 is divided into a plurality of distinct regions—a first region 408, a second region 410, a region 412, a fourth region 414, and a fifth region 416. The example space 400 may include additional or fewer regions, in some instances. As shown in FIGS. 4A-4B, the regions within a space may be defined by walls between rooms. In addition, the regions may be defined by ceilings between floors of a building. For example, the space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in the region 408 is represented as a person 106, but the moving object can be another type of object, such as an animal or an inorganic object.

In the example shown, a first wireless communication device 402A is located in the region 414 of the space 400, a second wireless communication device 402B is located in the region 410 of the space 400, and a third wireless communication device 402C is located in the region 416 of the space 400. The example wireless communication devices 402 can operate in the same or similar manner as the wireless communication devices 102 of FIG. 1. For instance, the wireless communication devices 402 may be configured to transmit and receive wireless signals, and detect whether motion has occurred in the space 400 based on the received signals. As an example, the wireless communication devices 402 may periodically or repeatedly transmit motion probe signals (e.g., signals formatted similar to the motion probe signal 202 of FIG. 2) through the space 400, and receive signals based on the motion probe signals. The wireless communication devices 402 can analyze the received signals to detect whether an object has moved in the space 400, such as, for example, by analyzing channel responses associated with the space based on the received signals. In addition, in some implementations, the example wireless communication devices 402 can analyze the received signals to identify a location of detected motion within the space 400. For example, the wireless communication devices 402 can analyze characteristics of the channel response to determine whether the channel responses share the same or similar characteristics to channel responses known to be associated with the regions 408, 410, 412, 414, 416 of the space 400.

In the examples shown, one (or more) of the wireless communication devices 402 repeatedly transmits a motion probe signal (e.g., a reference signal) through the space 400. The motion probe signals may have a flat frequency profile in some instances, wherein the magnitude of each frequency component $f_1$, $f_2$, and $f_3$. For example, the motion probe signals may have a frequency response similar to the frequency domain representation 350 shown in FIGS. 3C-3D. The motion probe signals may have a different frequency profile in some instances. Because of the interaction of the reference signal with the space 400 (and the objects therein), the signals received at another wireless communication device 402 that are based on the motion probe signal transmitted from the other wireless communication device 402 are different from the transmitted reference signal.

Based on the received signals, the wireless communication devices 402 can determine a channel response for the space 400. When motion occurs in distinct regions within the space, distinct characteristics may be seen in the channel responses. For example, while the channel responses may differ slightly for motion within the same region of the space 400, the channel responses associated with motion in distinct regions may generally share the same shape or other characteristics. For instance, the channel response 401 of FIG. 4A represents an example channel response associated with motion of the object 406 in the region 408 of the space 400, while the channel response 403 of FIG. 4B represents an example channel response associated with motion of the object 406 in the region 412 of the space 400. The channel responses 401, 403 are associated with signals received by the same wireless communication device 402 in the space 400.

FIGS. 4C-4D are plots showing the example channel responses 401, 403 of FIGS. 4A-4B overlaid on an example of channel response 460 associated with no motion occurring in the space. When motion occurs in the space 400, a variation in the channel response will occur relative to the "no-motion" channel response 460, and thus, motion of an object in the space 400 can be detected by analyzing variations in the channel responses. In addition, a relative location of the detected motion within the space 400 can be identified. For example, the shape of channel responses associated with motion can be compared with reference information (e.g., using a trained neural network) to categorize the motion as having occurred within a distinct region of a space.

When there is no motion in the space 400 (e.g., when the object 406 is not present), a wireless communication device 402 may compute a "no-motion" channel response 460. Slight variations may occur in the channel response due to a number of factors; however, multiple "no-motion" channel responses associated with different periods of time may share one or more characteristics. In the example shown, the "no-motion" channel response 460 has a decreasing frequency profile (the magnitude of each frequency component $f_1$, $f_2$, and $f_3$ is less than the previous). The profile of a no-motion channel response 460 may differ in some instances (e.g., based on different room layouts or placement of the devices 402).

When motion occurs in the space 400, a variation in the channel response will occur. For instance, in the examples shown in FIGS. 4C-4D, the channel response 401 (associated with motion of the object 406 in region 408) differs from the "no-motion" channel response 460 and the channel response 403 (associated with motion of the object 406 in region 412) also differs from the "no-motion" channel response 460. The channel response 401 has a concave-parabolic frequency profile (the magnitude of the middle frequency component $f_2$ is less than the outer frequency components $f_1$ and $f_3$), while the channel response 403 has a convex-asymptotic frequency profile (the magnitude of the middle frequency component $f_2$ is greater than the outer frequency components $f_1$ and $f_3$). The profiles of the channel responses 401, 403 may differ in some instances (e.g., based on different room layouts or placement of the devices 402).

Analyzing channel responses may be considered similar to analyzing a digital filter. In other words, a channel response has been formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles shoot up the frequency components of a channel response and appear as peaks or high points in the response, while zeros pull down the frequency components of a channel response and appear as low point or nulls in the response). A changing digital filter can be characterized by the locations of its peaks and valleys, and a channel response may be characterized similarly by its peaks and valleys. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique "signatures" or profiles may be identified for distinct regions within a space.

In some implementations, the profiles of the channel responses associated with motion in distinct regions of the space 400 can be "learned." For example, machine learning may be used to categorize channel response characteristics with motion of an object within distinct regions of a space. In some cases, a user associated with the wireless communication devices 402 (e.g., an owner or other occupier of the space 400) can assist with the learning process. For instance, referring to the examples shown in FIGS. 4A-4B, the user can move in each of the distinct regions 408, 410, 412, 414, 416 during a learning phase and may indicate (e.g., through a user interface on a mobile computing device) that he/she is moving in one of the particular regions in the space. For example, while the user is moving through the region 408 (e.g., as shown in FIG. 4A) the user may indicate on a mobile computing device that he/she is in the region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of the space 400.

The tagged channel responses can then be processed (e.g., by machine learning software) to identify unique characteristics of the channel responses associated with motion in the distinct regions. Once identified, the identified unique characteristics may used to determine a location of detected motion for newly computed channel responses. For example, a neural network (convolutional or fully connected) may be trained using the tagged channel responses, and once trained, newly computed channel responses can be input to the neural network, and the neural network can output a location of the detected motion. For example, in some cases, mean, range, and absolute values are input to a neural network. In some instances, magnitude and phase of the complex channel response itself may be input as well. These values allow the neural network to design arbitrary front-end filters to pick up the features that are most relevant to making accurate predictions with respect to motion in distinct regions of a space. In some implementations, the neural network is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.). The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, will be trying to aggregate values in a certain region to cluster them, which can be done by creating a logistic classifier based decision surfaces. The decision surfaces divide different clusters and subsequent layers can form categories based on a single cluster or a combination of clusters.

In some implementations, a neural network includes two or more layers of inference. The first layer acts as a logistic classifier which can divide different concentration of values into separate clusters, while the second layer combines some of these clusters together to create a category for a distinct region. Additional, subsequent layers can help in extending the distinct regions over more than two categories of clusters. For example, a fully-connected neural work may include an input layer corresponding to the number of features tracked, a middle layer corresponding to the number of effective clusters (through iterating between choices), and a final layer corresponding to different regions. Where complete channel response information is input to the neural network, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

Figure 5:
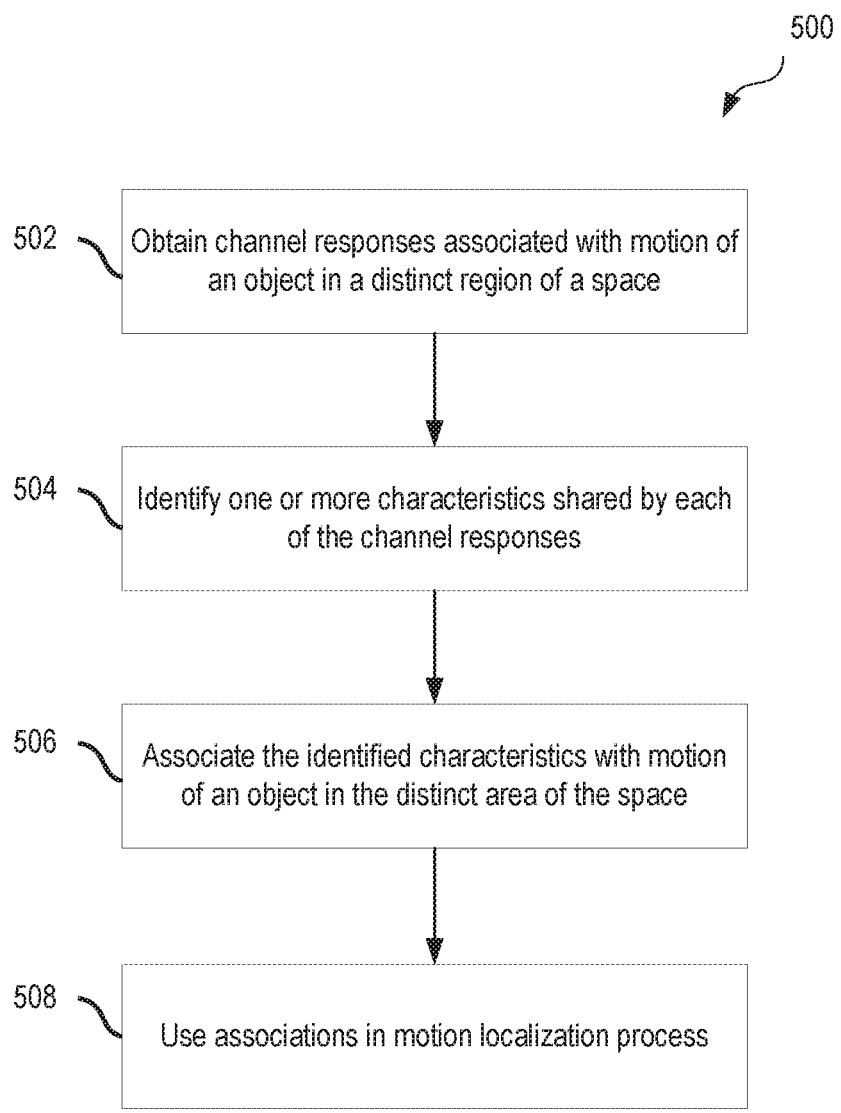
FIG. 5 is a flow diagram showing an example process of associating a shared channel response characteristic with a distinct region within a space.

FIG. 5 is a flow diagram showing an example process 500 of associating a shared channel response characteristic with a distinct region (e.g., the regions 408, 412 of FIGS. 4A-4B) within a space (e.g., space 400 of FIGS. 4A-4B). Operations in the example process 500 may be performed by a data processing apparatus of a wireless communication device (e.g., the processor 114 of the example wireless communication device 102C in FIG. 1) to associated channel response characteristics with motion in distinct regions of a space (e.g., the regions 408, 410, 412, 414, 416 of the space 400). The example process 500 may be performed by another type of device. For instance, operations of the process 500 may be performed by a system other than the wireless communication device, such as, for example, a computer system connected to the wireless communication devices. The example process 500 may include additional or different operations, and the operations may be performed in the order shown or in another order. In some cases, one or more of the operations shown in FIG. 5 are implemented as processes that include multiple operations, sub-processes or other types of routines. In some cases, operations can be combined, performed in another order, performed in parallel, iterated, or otherwise repeated or performed another manner.

At 502, one or more channel responses associated with motion of an object in a distinct region within a space are obtained. The channel responses are based on wireless signals transmitted through the space by one or more wireless communication devices of a wireless communication system (e.g., the wireless communication system 100 of FIG. 1). For instance, referring to the example shown in FIGS. 3A-3B, the channel response may be based on the wireless signals transmitted through the space 300 by the wireless communication device 304A and received at one of the wireless communication devices 304B, 304C. Further, referring to the example shown in FIGS. 4A-4B, the channel response may be based on wireless signals transmitted through the space 400 by one or more of the wireless communication devices 402 and received at one or more of the wireless communication devices 402.

In some implementations, the channel responses are obtained while the wireless communication system is in a "training mode". For instance, the wireless communication devices (or another computing device communicably coupled to the wireless communication devices, e.g., a remote server) can receive user input that indicates a training mode has begun or is to begin. As an example, the wireless communication system may receive user input may specify a distinct region in the space using a region identifier (e.g., "kitchen," "office 1," "office 2," "upstairs balcony"), and may prompt the user to move within the specified region. Accordingly, the channel responses obtained during the training mode can become tagged data. For example, the channel responses may be tagged in association with the region identifier of the distinct region in the space.

In some implementations, the channel responses obtained while the wireless communication system is in a training mode are obtained during a training period. For example, the wireless communication system may notify the user of the start of the training period, and the end or the duration of the training period. The wireless communication system can present (e.g., via an audio playback or visual display) an indicator to the user instructing the user to move within the distinct region of the space during the training period, or another indicator to the that instructs the user to provide no motion (e.g., not move) within the region of the space during the training period. For instance, referring to the example shown in FIGS. 4A-4B, a wireless communication device 402 can obtain channel responses similar to the channel response 401 during a first training period that includes a user moving within the region 408, and can obtain channel responses similar to the channel response 403 during a training period that includes a user moving within the region 412.

At 504, one or more characteristics shared by each of the channel responses are identified in the obtained channel responses. A shared characteristic may be identified by analyzing the channel responses obtained at 502, for example, by comparing the obtained channel responses, by combining the obtained channel responses with each other, or by detecting patterns (e.g., shapes, contours, magnitudes of frequency components) in each of the obtained channel responses and identifying repetitive patterns associated with each distinct region with the space. For instance, referring to the example shown in FIGS. 4A-4B, the wireless communication system can identify the concave-parabolic frequency profile as a shared characteristic of the channel responses 401 obtained during a first training period during which a user is moving with the region 408, and can identify the convex-asymptotic frequency profile as a shared characteristic of the channel responses 403 obtained during a second training period during which a user is moving with the region 412.

In some implementations, the shared characteristics may be determined by using machine learning. For example, a neural network (convolutional or fully connected) may be trained (e.g., as described above) using tagged channel responses obtained at 502. Through training, the neural network may "learn" the shared characteristics for channel responses associated with motion in each of the distinct regions of the space.

At 506, the identified characteristics are associated with the distinct region within the space. In some instances, the associations are made in a motion detection database that stores information regarding the shared characteristics identified at 504 as being associated with region identifiers specified at 502. The motion detection database enables the wireless communication system to recall identified shared characteristics associated with a given distinct area of the space, and to recall the distinct area of the space associated with a given shared characteristic or set of shared characteristics. The motion detection database can be stored in memory of a wireless communication device (e.g., the memory 116 in FIG. 1) of the wireless communication system, or another device communicably coupled to the wireless communication system. The motion detection database may be implemented as a traditional database, or as a neural network (e.g., functions with certain weightings applied to various variables, where the weightings are based on training of the neural network).

In some implementations, the association at 506 is executed by the wireless communication system in connection with a neural network. For example, a modem of a wireless communication device can connect (via a computer network such as the Internet) to a cloud-computing system that includes a neural network implementing the motion detection database. The wireless communication device may transmit channel responses obtained at 502 to the neural network as tagged data. In response, the neural network may analyze the tagged channel responses, identify one or more characteristics shared by each of the obtained channel responses, and store the shared characteristics in the motion detection database (e.g., as a function with various weightings). In some instances, the neural network may associate a pattern detected in a majority of the obtained channel responses with motion of an object in the distinct region within the space. The associations generated by the neural network are stored in the motion detection database of the cloud-computing systems, and may be accessed by the wireless communication devices of the wireless communication system or another device communicably coupled to the wireless communication system. For instance, referring to the example shown in FIGS. 4A-4B, the wireless communication system (via the neural network) can associate the concave-parabolic frequency profile with motion of the person 406 in the region 408 of the space 400, and can associate the convex-asymptotic frequency profile with motion of the person 406 in the region 412 of the space 400.

At 508, after associating the identified characteristics with motion of the object in the distinct area of the space, the associations made at 506 are used in a motion localization process. In some instances, at 508, the wireless communication system is no longer in the "training mode". For example, additional channel responses may be obtained based on wireless signals transmitted through the space. The wireless communication system can use the additional channel in a motion localization process, such as, for example, the process 600 of FIG. 6.

In some implementations, the process 500 can be implemented to associate channel response characteristics with particular categories of motion that may be detected. For instance, referring to the example shown in FIGS. 4A-4B, when a dog moves within the region 408, the channel response associated with that motion may be different from the channel response 401 associated with motion by a human in the region 408. The channel response associated with dog movement in the region 408 may accordingly have its own unique characteristics, and the process 500 can be implemented to associate dog motion with certain characteristics (e.g., so that motion by a dog versus a human can be distinguished).

Figure 6:
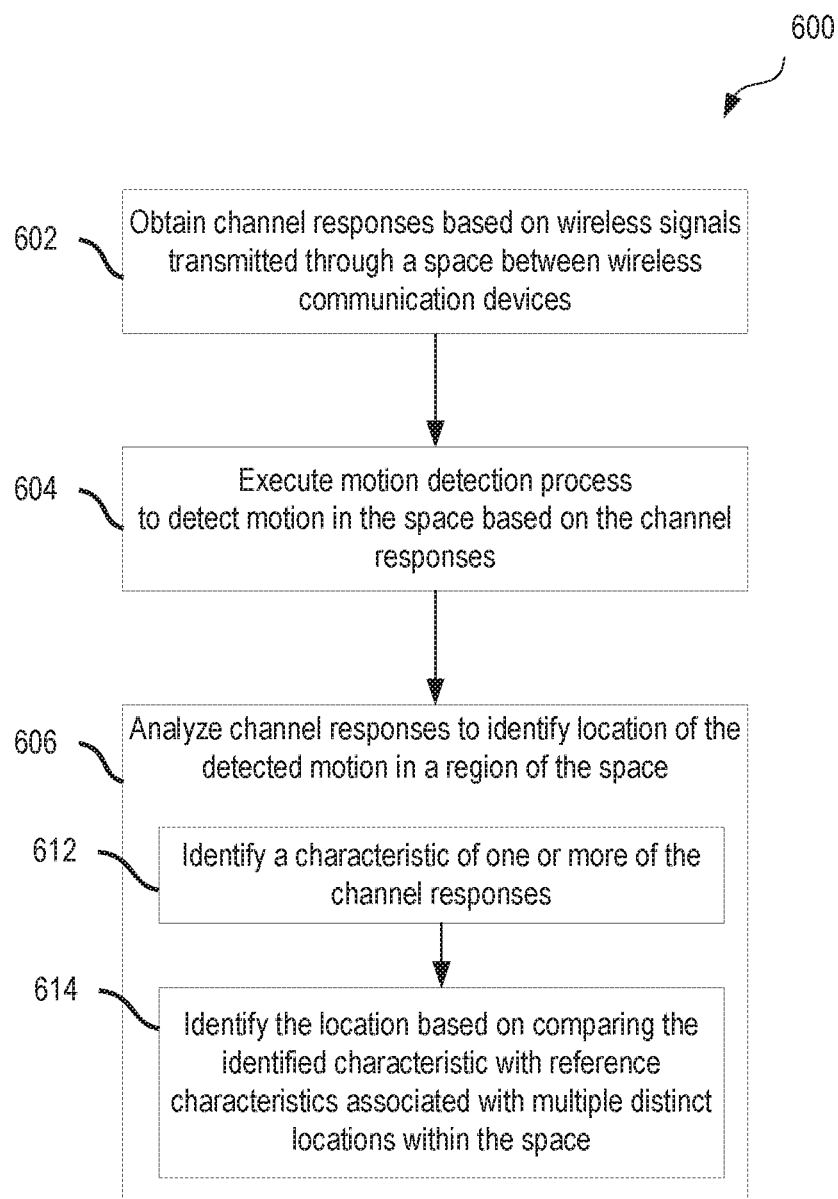
FIG. 6 is a flow diagram showing an example process of motion localization based on channel response characteristics.

FIG. 6 is a flow diagram showing an example process 600 of motion localization based on channel response characteristics. Operations in the example process 600 may be performed by a data processing apparatus of a wireless communication device (e.g., the processor 114 of the example wireless communication device 102C in FIG. 1) to associated channel response characteristics with motion in distinct regions of a space (e.g., the regions 408, 410, 412, 414, 416 of the space 400). The example process 600 may be performed by another type of device. For instance, operations of the process 600 may be performed by a system other than the wireless communication device, such as, for example, a computer system connected to the wireless communication devices. The example process 600 may include additional or different operations, and the operations may be performed in the order shown or in another order. In some cases, one or more of the operations shown in FIG. 6 are implemented as processes that include multiple operations, sub-processes or other types of routines. In some cases, operations can be combined, performed in another order, performed in parallel, iterated, or otherwise repeated or performed another manner.

At 602, channel responses are obtained based on wireless signals transmitted through a space between wireless communication devices. In some instances, at 602, the wireless communication system is not in a training mode. The channel response may be obtained by each of the wireless communication devices in the wireless communication system based on signals received at that wireless communication device.

At 604, a motion detection process is executed to detect motion of an object in the space based on the channel responses obtained at 602. In some implementations, the motion detection process may analyze changes in the channel responses obtained at different points in time to detect whether motion has occurred in the space accessed by the wireless signals. That is, the motion detection process may detect motion at 604 in response to the detection of a change in the channel response over the different time points. The motion detection process may analyze other aspects of the received wireless signals to detect motion in the space. In some implementations, motion may be detected by providing the channel responses to a trained neural network. For example, the channel responses obtained at 602 may be provided as inputs to a neural network, and the neural network may provide an output that indicates whether motion is present in the space. The output of the neural network may be based on a function with various weightings determined during a training process. The neural network may be a convolutional neural network, a fully connected neural network, or a combination thereof.

At 606, the channel responses are analyzed to identify a location of the motion within one of a plurality of regions within the space. In other words, a location of the motion within one of a plurality of regions within the space is identified based on results of analyzing the channel responses. In some implementations, the channel responses are obtained over a series of time points, and the location of the motion is identified based on a characteristic shared by the channel responses from each of the respective time points in the series. In the example shown, channel responses are analyzed to identify a location of the motion within one of a plurality of regions within the space by identifying, at 612, a characteristic of one or more of the channel responses, and identifying, at 614, a location of the detected motion based on comparing the identified characteristic with reference characteristics associated with multiple distinct locations within the space.

The channel response characteristic(s) may be identified by identifying a shape or contour defined by frequency components of the channel responses. The identification of the shape of the contour could be achieved by implementing curve fitting techniques, or by implementing predictive estimation techniques (e.g., interpolation or extrapolation). For example, referring to FIGS. 4C-4D, the shared characteristic among the channel responses obtained at 602 could be identified as the concave-parabolic frequency profile of the channel response 401, the convex-asymptotic frequency profile of the channel response 403, or the decreasing frequency profile of the no-motion channel response 460. The reference characteristics may include, for example, entries in a motion detection database that associates each of the channel response characteristics with one distinct region from among the plurality of regions within the space. If a concave-parabolic frequency profile is identified at 612, then the region 408 may be identified as the location of the detected motion based on a comparison of the concave-parabolic frequency profile of the newly obtained channel response with reference characteristics stored in the motion detection database and associated with the region 408, the region 412, or another region in the space 400 (or with channel responses associated with no motion).

In some implementations, identifying and comparing a channel response characteristic with reference characteristics includes providing the channel response obtained at 602 as inputs to a trained neural network, and identifying the location of the detected motion is based on an output of the neural network. For example, a neural network may be trained using tagged channel responses, as described above. After training, newly obtained channel responses can be input to the trained neural network, and the neural network can output an identifier associated with a distinct region of the space. The output of the neural network may be based on a function with various weightings determined during a training process. The neural network may be a convolutional neural network, a fully connected neural network, or a combination thereof. The channel responses may be analyzed in another manner to identify a location of detected motion.

In some implementations, analyzing the channel responses at 606 may include analyzing changes in the characteristics identified at 612. Detected changes in the identified characteristics of the channel response may indicate that the motion is changing locations. By analyzing the changes in the channel response over time, motion of an object through the space may be tracked. For instance, referring to the example shown in FIGS. 4A-4B, as the object 406 moves from the region 408 to the region 412, the channel response may slowly change from the shape shown in channel response 401 to the shape shown in channel response 403. By analyzing the change in the characteristics of the channel response over time, motion by the object 406 can be tracked over time.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices). The computer-readable storage medium can include multiple computer-readable storage devices. The computer-readable storage devices may be co-located (instructions stored in a single storage device), or located in different locations (e.g., instructions stored in distributed locations).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an internetwork (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of some of the examples described, a motion detection system performs machine learning to associate motion of an object within a distinct region within a space with characteristics shared by channel responses obtained while motion of the object occurred within the distinct region. Also, the motion detection system performs RF motion localization to identify a distinct region within the space based on the machine-learned associations stored in a motion detection database. Each machine-learned association includes a shared channel response characteristic associated with a distinct region within the space.

In a first example, a motion detection method includes obtaining channel responses based on wireless signals transmitted through a space between wireless communication devices. The method further includes executing a motion detection process to detect motion of an object in the space based on the channel responses. The method includes, by operation of one or more processors, analyzing the channel responses to identify a location of the motion within one of a plurality of regions within the space.

Implementations of the first example may, in some cases, include one or more of the following features. Analyzing the channel responses to identify the location includes identifying a characteristic of one or more of the channel responses; and identifying the location based on comparing the identified characteristic with reference characteristics associated with multiple distinct locations within the space. Identifying the characteristic of one or more of the channel responses includes identifying a shape of a contour defined by one or more of the channel responses. The reference characteristics include entries in a motion detection database that associates each of the channel response characteristics with one distinct region from among the plurality of regions within the space. A change in the characteristic may be identified over time and a change in the identified location may be identified based on the change in the characteristic over time. Analyzing the channel responses to identify the location of the detected motion may include providing the channel responses as input to a neural network and identifying the location of the detected motion based on an output of the neural network.

Implementations of the first example may, in some cases, include one or more of the following features. The channel responses are associated with a series of time points. The method further comprises identifying the location of the motion based on a characteristic shared by channel responses associated with distinct time points in the series. The motion detection process detects the motion based on changes over the time series, between channel responses associated with distinct time points.

Implementations of the first example may, in some cases, include one or more of the following features. Each of the wireless signals is transmitted by a first wireless communication device and received by a second wireless communication device, and each of the channel responses is generated from a respective one of the wireless signals received by the second wireless communication device.

Implementations of the first example may, in some cases, include one or more of the following features. The space comprises a building. Each of the plurality of regions within the space comprise at least one of: a floor of the building, a room in the building, or a set of rooms in the building. The set of rooms in the building includes less than a totality of the building.

In a second example, a motion detection method includes obtaining channel responses associated with motion of an object in a distinct region within a space. The channel responses are based on wireless signals transmitted through the space by one or more wireless communication devices. The method includes, by operation of one or more processors, identifying a characteristic shared by each of the channel responses. The method includes associating, in a motion detection database, the characteristic with the distinct region within the space.

Implementations of the second example may, in some cases, include one or more of the following features. The channel responses are first channel responses, the distinct region of the space is a first region, and the characteristic is a first characteristic. The method further includes obtaining second channel responses associated with motion of an object in a second distinct region within the space; identifying a second characteristic shared by each of the second channel responses; and associating, in the motion detection database, the second characteristic with the second distinct region. Identifying the characteristic shared by each of the channel responses may include providing the channel responses as input to a neural network, and associating the characteristic with the distinct region may include training the neural network based on the channel responses provided as input.

Implementations of the second example may, in some cases, include one or more of the following features. The method further includes, after associating the characteristic with motion of an object in the distinct region of the space, obtaining additional channel responses based on wireless signals transmitted through the space between wireless communication devices; and using the motion detection database to identify motion in the distinct region. In the method, using the motion detection database to identify motion in the distinct region comprises executing a motion detection process to detect motion of the object in the space based on the additional channel responses. In the method, using the motion detection database to identify motion in the distinct region comprises, by operation of one or more processors, analyzing the additional channel responses to identify the location of the motion within one of a plurality of regions within the space. The analyzing of the additional channel responses to identify the location of the motion within one of a plurality of regions within the space includes identifying a characteristic of one or more of the channel responses; and identifying the location based on comparing the identified characteristic with reference characteristics associated with multiple distinct locations within the space. The reference characteristics include entries in the motion detection database. The motion detection database associates each of the channel response characteristics with one distinct region from among the plurality of regions within the space.

Implementations of the second example may, in some cases, include one or more of the following features. The space comprises a building. Each of the plurality of regions within the space comprise at least one of: a floor of the building, a room in the building, or a set of rooms in the building. The set of rooms in the building includes less than a totality of the building.

In some implementations, a computer-readable medium stores instructions that are operable when executed by a data processing apparatus to perform one or more operations of the first and second examples. In some implementations, a system (e.g., a wireless communication device, computer system, a combination thereof, or other type of system communicatively coupled to the wireless communication device) includes one or more data processing apparatuses and memory storing instructions that are operable when executed by the data processing apparatus to perform one or more operations of the first and second examples.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
   obtaining channel responses based on wireless signals transmitted through a space between wireless communication devices;
   executing a motion detection process to detect motion of an object in the space based on the channel responses; and
   by operation of one or more processors, analyzing the channel responses to identify a location of the detected motion within one of a plurality of regions within the space.

2. The method of claim 1, wherein analyzing the channel responses to identify the location of the detected motion comprises:
   identifying a characteristic of one or more of the channel responses; and
   identifying the location based on comparing the identified characteristic with reference characteristics associated with multiple distinct locations within the space.

3. The method of claim 2, wherein identifying the characteristic of one or more of the channel responses comprises identifying a shape of a contour defined by one or more of the channel responses.

4. The method of claim 2, wherein the reference characteristics comprise entries in a motion detection database that associates each of the reference characteristics with one distinct region from among the plurality of regions within the space.

5. The method of claim 2, comprising identifying a change in the characteristic over time and identifying a change in the identified location based on the change in the characteristic over time.

6. The method of claim 1, wherein the channel responses are associated with a series of time points, and the method comprises identifying the location of the motion based on a characteristic shared by channel responses associated with distinct time points in the series.

7. The method of claim 6, wherein the motion detection process detects the motion based on changes over the time series, between channel responses associated with distinct time points.

8. The method of claim 1, wherein each of the wireless signals is transmitted by a first wireless communication device and received by a second wireless communication device, and each of the channel responses is generated from a respective one of the wireless signals received by the second wireless communication device.

9. The method of claim 1, wherein the space comprises a building, and each of the plurality of regions within the space comprise at least one of: a floor of the building, a room in the building, or a set of rooms in the building, wherein the set of rooms in the building includes less than a totality of the building.

10. The method of claim 1, wherein analyzing the channel responses to identify the location of the detected motion comprises providing the channel responses as input to a neural network and identifying the location of the detected motion based on an output of the neural network.

11. A motion detection system comprising:
multiple wireless communication devices, each wireless communication device configured to detect motion of an object in the space based on a series of wireless signals received from other wireless communication devices; and
a data processing apparatus communicably coupled to the wireless communication devices and configured to:
obtain channel responses based on wireless signals transmitted through a space between the wireless communication devices;
execute a motion detection process to detect motion of an object in the space based on the channel responses; and
analyze the channel responses to identify a location of the motion within one of a plurality of regions within the space.

12. The system of claim 11, wherein the data processing apparatus is configured to analyze the channel responses to identify the location by:
identifying a characteristic of one or more of the channel responses; and
identifying the location based on comparing the identified characteristic with reference characteristics associated with multiple distinct locations within the space.

13. The system of claim 12, wherein the data processing apparatus is configured to identify the characteristic of one or more of the channel responses by identifying a shape of a contour defined by one or more of the channel responses.

14. The system of claim 12, wherein the reference characteristics comprise entries in a motion detection database that associates each of the reference characteristics with one distinct region from among the plurality of regions within the space.

15. The system of claim 12, wherein the data processing apparatus is configured to identify a change in the characteristic over time and identify a change in the identified location based on the change in the characteristic over time.

16. The system of claim 11, wherein the channel responses are associated with a series of time points, and the data processing apparatus is configured to identify the location of the motion based on a characteristic shared by channel responses associated with distinct time points in the series.

17. The system of claim 16, wherein executing the motion detection process comprises detecting the motion based on changes over the time series, between channel responses associated with distinct time points.

18. The system of claim 11, wherein the space comprises a building, and each of the plurality of regions within the space comprise at least one of: a floor of the building, a room in the building, or a set of rooms in the building, wherein the set of rooms in the building includes less than a totality of the building.

19. The system of claim 11, wherein the data processing apparatus is configured to analyze the channel responses to identify the location of the detected motion by providing the channel responses as input to a neural network and identifying the location of the detected motion based on an output of the neural network.

20. A non-transitory computer-readable medium comprising instructions which, when executed by a processor, cause the processor to:
obtain channel responses based on wireless signals transmitted through a space between wireless communication devices;
execute a motion detection process to detect motion of an object in the space based on the channel responses; and
analyze the channel responses to identify a location of the detected motion within one of a plurality of regions within the space.

21. The medium of claim 20, wherein analyzing the channel responses to identify the location of the detected motion comprises:
identifying a characteristic of one or more of the channel responses; and
identifying the location based on comparing the identified characteristic with reference characteristics associated with multiple distinct locations within the space.

22. The medium of claim 21, wherein identifying the characteristic of one or more of the channel responses comprises identifying a shape of a contour defined by one or more of the channel responses.

23. The medium of claim 21, wherein the reference characteristics comprise entries in a motion detection database that associates each of the reference characteristics with one distinct region from among the plurality of regions within the space.

24. The medium of claim 21, comprising instructions to identify a change in the characteristic over time and identify a change in the identified location based on the change in the characteristic over time.

25. The medium of claim 20, wherein the channel responses are associated with a series of time points, and the medium comprises instructions to identify the location of the motion based on a characteristic shared by channel responses associated with distinct time points in the series.

26. The medium of claim 25, wherein executing the motion detection process comprises detecting the motion based on changes over the time series, between channel responses associated with distinct time points.

27. The medium of claim 20, wherein each of the wireless signals is transmitted by a first wireless communication device and received by a second wireless communication device, and each of the channel responses is generated from a respective one of the wireless signals received by the second wireless communication device.

28. The medium of claim 20, wherein the space comprises a building, and each of the plurality of regions within the space comprise at least one of: a floor of the building, a room in the building, or a set of rooms in the building, wherein the set of rooms in the building includes less than a totality of the building.

29. The medium of claim 20, wherein analyzing the channel responses to identify the location of the detected motion comprises providing the channel responses as input to a neural network and identify the location of the detected motion based on an output of the neural network.

* * * * *